United States Patent [19]

Kolerus et al.

[11] 3,860,749

[45] Jan. 14, 1975

[54] METHOD AND DEVICE FOR THE PRODUCTION OF PRINTING STENCILS

[75] Inventors: Josef Kolerus; Hans Peterschinegg, both of Vienna, Austria

[73] Assignee: Peter Zimmer, Kufstein, Austria

[22] Filed: Mar. 19, 1973

[21] Appl. No.: 342,885

[30] Foreign Application Priority Data

Mar. 24, 1972 Austria .............................. 2592/72

[52] U.S. Cl. ............................................... 178/6.6 B
[51] Int. Cl. ............................................... H04n 1/24
[58] Field of Search ........................ 178/6.6 B, 6.6 R

[56] References Cited

UNITED STATES PATENTS

| | | | |
|---|---|---|---|
| 3,582,549 | 6/1971 | Hell et al. | 178/6.6 B |
| 3,760,098 | 9/1973 | de Vos et al. | 178/6.6 B |
| 3,769,455 | 10/1973 | de Vos et al. | 178/6.6 B |
| 3,770,888 | 11/1973 | de Vos et al. | 178/6.6 B |

*Primary Examiner*—Vincent P. Canney
*Attorney, Agent, or Firm*—Ernest G. Montague; Karl F. Ross; Herbert Dubno

[57] ABSTRACT

A method of and an apparatus for the production of printing matrices with the aid of at least one light-sensitive layer applied to a matrix or a matrix support. The exposure of the uppermost, light-sensitive layer is effected by the consecutive projection of pattern-dictated raster dots or groups of raster dots in the peripheral direction of the matrix or the matrix support, and the apparatus comprises the matrix or matrix support, and a raster-dot pattern-carrying roller as well as a device for exposing the uppermost light-sensitive layer by the consecutive projection of the raster dots or groups of the raster dots in the peripheral direction of the matrix or matrix support.

25 Claims, 3 Drawing Figures

METHOD AND DEVICE FOR THE PRODUCTION OF PRINTING STENCILS

The invention relates to a method and apparatus for the production of printing matrices with the aid of at least one light-sensitive layer applied to a matrix or a matrix support. In particular, the invention relates to a method of producing screen-printing plates, preferably cylindrical plates, by a galvaneplastic technique.

Cylindrical plates for screen-printing are preferably produced by the galvaneplastic technique, through the deposition of metals originating in electrolytic baths, in the form of screen-equipped drums, upon the surface of metal matrices. To this end, the surface of the matrix is covered by insulating dots of lacquer at these points affected by the pattern as being intended to appear on the cylindrical plate as open areas, and thus the surface concerned is made non-conducting. Through this means, these pattern-associated dots remain open during the galvanizing process and permit the passage of printing ink through the cylindrical plate during the screen-printing process.

This masking of the surface of the matrix is nowadays mostly carried out by a photographic technique. For this purpose, the surface of a metal cylinder is covered with a ligh-sensitive lacquer of insulating type. If a film bearing the desired pattern is laid across this photo-sensitive layer and if exposure is effected through the film, then the photo-sensitive layer, according to the type involved, will be either hardened or decomposed on the exposed spots. A screen has, however, to be superimposed on the pattern in order later, after galvanising, to arrive at a coherent screen-equipped drum or to achieve half-tone effects. Ensuing development of the photo-sensitive layer dissolves the unexposed, non-hardened or light-affected and decomposed spots of the photo-sensitive layer, with the consequence that the metal base of the matrix is laid bare.

The above-mentioned photographic method is not only applied in the galvaneplastic production of screen-printing plates, but is also used elsewhere in the production of printing matrices, e.g., in the production of intaglia or relief printing matrices, in that process, after development, on the photo-sensitive layer applied to a matrix support (a plate, a cylinder) by etching means a specimen in surface-relief being created corresponding to the master-pattern.

Drawbacks of this production method consist in the fact that, apart from extensive procedures for producing the films suitable as patterns for copying, the latter cannot be stretched over the matrix or the matrix support without a seam at the butt joint, so that — particularly when fine cot rasters are being employed — after developing the photo-sensitive layer extensive retouching efforts are necessary at the join of the axis of the file.

In accordance with the invention, these deficiencies are obviated through the fact that the exposure of the uppermost, light-sensitive layer takes place by the chronologically sequential projection of pattern-dictated raster dots or groups of raster dots in the peripheral direction of the matrix or matrix support. Through this, the effect is achieved that an acid-resistant, light-sensitive layer suitable for the ensuing treatment (galvanizing, etching or the like) by physico-chemical techniques can be directly provided with the pattern through the assistance of light sources of high intensity and frequency, e.g., through flash-light techniques.

A practical modification of the method according to the invention consists in the technique that a second layer, less light-sensitive but highly acid-resistant and arranged under the uppermost, light-sensitive layer, is exposed to light over large areas chronologically after the dot-by-dot projection and the development of the pattern-dictated screen-associated dots on the uppermost layer. Hence, according to this modification of the method, first the uppermost, light-sensitive layer is provided with the pattern by the high-frequency group-by-group exposure method and is subsequently developed; it may, for instance, be a silver/halogen-containing thin layer which becomes opaque to light at the exposed spots through exposure and the subsequent developing process. By these means the chemical-resistant and light-sensitive layer located beneath these spots carry on their surface dots arranged in a pattern and already opaque to light. In this state, the second exposure ensues, in this, however, for every unit of surface area, a substantially longer exposure time being available. It may, for instance, be possible to make exposure of large areas by means of bar-shaped metal-halogen vapour lamps or the like. The second exposure may also be effected by a high-intensity single-point light-source which travels parallel to the axis of the plate. The power layer, less light-sensitive but on the other hand acid-resistant, can be fully exposed by these means. The advantage of this method lies in the fact that the first point-by-point light-processing of the pattern can be carried out at very high frequencies, as a result of the great sensitivity of the uppermost, maximally light-sensitive layer, and through this circumstance even the finest screen can be produced within commercially acceptable production times.

The invention will now be further described, by way of example, with reference to the accompanying drawings, in which.

Figure 1:
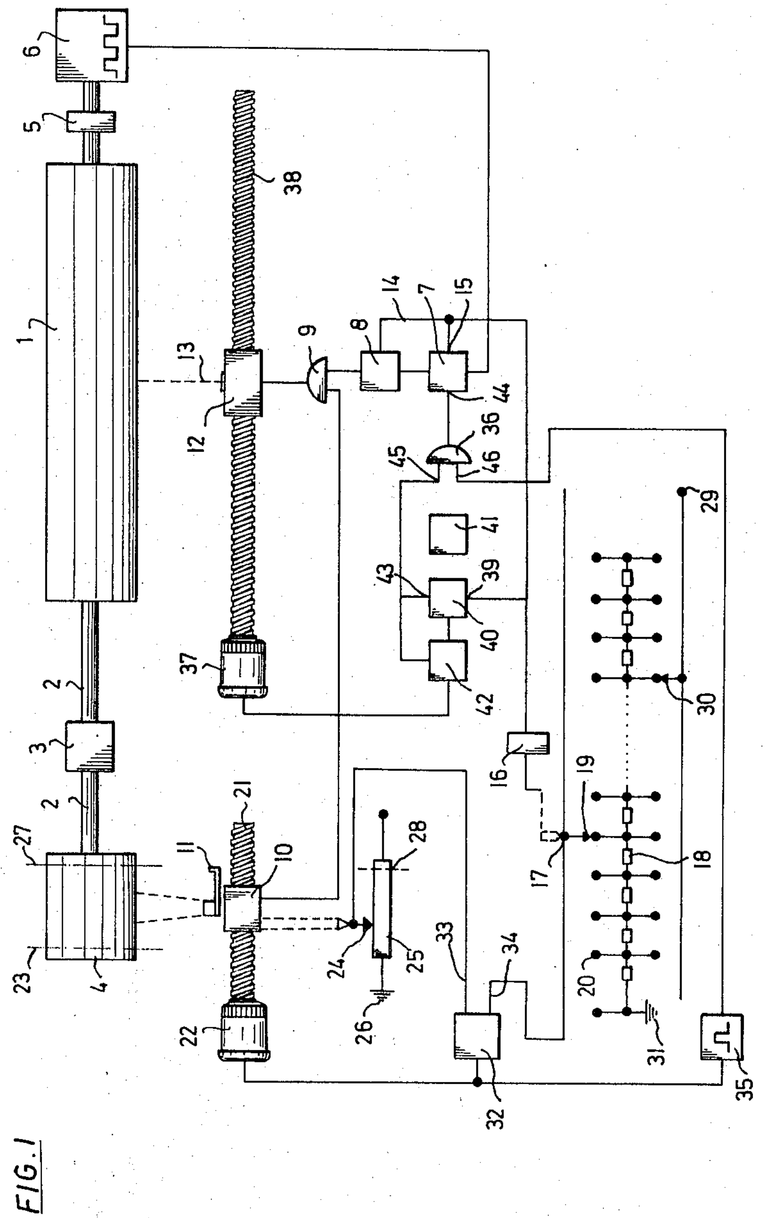
FIG. 1 shows a device for carrying out the method according to the invention.

As shown in FIG. 1, the matrix 1 on the surface of which at least one photo-sensitive layer has been deposited is mechanically connected by way of a shaft 2 and gearing 3 with a pattern-presenting roller 4. On the pattern-presenting roller 4 there is a single repeat pattern, hence the smallest possible part of the overall pattern to be light-processed on the matrix 1. The gearing 3 is arranged between the pattern-presenting roller 4 and the matrix 1 in the ratio of 1, 2 or 3 to 1, so that the matrix 1 will make one revolution while the pattern-presenting roller 4 will make one, two or three revolutions. Basically, the gear ratio may be any whole natural number, but generally in the textile master-plate producing industry the patterns occur some three or four times in the same order around the periphery of the printing plate. The gearing 3 may be a unit with exchangeable gear wheels but may also be a gear-shifting unit, so that the desired gear ratio, for instance 1:1 to 1:5, can be selected by rearranging the cog-wheels or by a gearshifting mechanism. Furthermore, the matrix 1 is, by way of further gearing 5, connected to a pulse generator 6. Around the periphery of the matrix 1 a large number of small pattern-associated dots, for instance of hexagonal cross-section, are to be light-processed. Since normally the peripheries of such matrices run to between 500 and 800 mm in length, and since for every cm about 7 to 32 dots have to be light-processed, the overall number of dots for processing around the periphery lies between 350 and 2,600. The pulse generator 6 bears inside it a number of optical — grade seal-marked discs each one of which possesses radially — or also on the cylindrical outer surfaces — a variable but exact division into marked units. With every change between light and dark, a pulse is omitted by a photo-cell which senses this marked-out division. The number of pulses during one rotation of the matrix 1 can be increased through the gearing mechanism 5 which transfers the speed of rotation of the matrix in multiplied fashion to the pulse generator 6. By these means, with a few simple and cheap marked-out plates and through a suitable choice of the marked-out disc and of the gear ratio in the gearng 5, the raster division and the circumference of the matrix can be matched up in the pulse generator. It should be emphasized still, that it is advantageous to couple the pulse — or frequency-generator mechanically rigidly with the matrix. The pulse generator 6 emits rectangular pulses which are fed to an electronic gate 7, and by way of that to a pre-selective digital counter 8. The gate 7 is located in the open position and at first permits the said pulses to proceed unhindered to the pre-selective digital counter 8, which registers each individual pulse and at each pulse moves one number on until it reaches the pre-selected number of pulses, as to that moment transferring these pulses in the form of opening pulses to an AND gate 9.

As already mentioned above, the pattern-presenting roller 4 carries the pattern (to be added on the matrix 1) in the form of a single repeat, this being a black and white drawing. From an optical recording head 10, by way of a turret-type optical system 11 a registering process takes place as to whether a bright spot or a dark spot is present on the pattern-presenting roller 4. This optical-recording head 10 operates with at least one photo-cell to which the image of the desired location on the pattern is transferred. During one revolution of the matrix 1, the pattern-presenting roller 4 may perform three revolutions, for example. During these three revolutions each of the photo-cells housed in the optical recording head 10 registers a series of light or dark dots depending on the pattern. For the sake of clearer illustration, in FIG. 1 the optical circuit is represented with only one photo-cell in the recording head 10; in practice, the recording head 10 is fitted with a large number of photo-cells, for instance ten, as will be explained hereinafter.

While the light spots last, an opening pulse is emitted from the photo-cell in the optical recording head 10, and this is also transferred to the AND gate 9. If the AND gate 9 receives an opening pulse both from the optical recording head 10 and also from the pre-selective digital counter 8, then these are passed through this unit and are transmitted to the flash-mechanism 12 in the form of a single pulse. This mechanism emits a light pulse 13 to the matrix 1 and there processes a hexagonal point on the surface of the latter. During one full revolution of the matrix 1, in correspondence with the gearing ratio of gearing 5 and with the optical-grade marked plate selected in the pulse generator 6 for the emission pulses, a given and already known number of pulses is supplied by the pulse generator 6. The pre-selective digital counter 8 is adjusted to this number. If this number of pulses is reached, then the counter emits a closing pulse to the CLOSE input 15 of the electronic gate 7, and simultaneously a pulse to the step-by-step relay 16. The electronic gate closes, and no longer permits any of the incoming pulses from the pulse generator 6 to proceed to the pre-selective digital counter 8. Simultaneously with the emission of the closing pulse, the pre-selective digital counter resets itself to zero.

Owing to the onward switching of the step-by-step relay 16, the stepping switch 17 is switched through one step forward to a voltage divider 18, hence travels, for instance, from contact 19 to contact 20. Through this procedure the following action is initiated. The optical recording head 10 is situated on a spindle 21 which is rotated by a servomotor 22 when the latter receives a voltage. If the optical recording head 10 is in such a position that the strip of pattern just then being sensed is directly adjacent to the start of the pattern 23, then a contact 24 connected to the optical recording head 10 tops off a zero voltage at the precision potentiomotor 25. This is represented in FIG. 1 by the earthing symbol 26. If the optical recording head 10 is in such a position that the strip of pattern just sensed in coming up against the end 27 of the pattern being presented, then the voltage of the location 28 is topped off at the precision potentiomotor 26. This voltage may be represented by U. The same voltage will be fed via a tapping contact not shown in the drawing to the rail 29 and will be supplied to contact 39 of the voltage divider 18. This contact 39 constitutes the *k* step of the voltage divider 18. Since at the left end 31 of the voltage divider 18 the same potential is present as at 26, the overall difference in voltage of the precision potentiomotor 25 between positions 26 and 28 is divided into *k* identical steps. These voltage steps can be tapped off at the contacts 19, 20 of the voltage divider 18. They are fed to the difference amplifier 32 which establishes the difference in voltage between the tapping contact 24 and the particular voltage-divider contact 19, 20 selected by the stepping switch 16, amplifies it and, given the presence of a voltage difference, feeds a drive voltage to the servomotor 22. By way of the spindle 21, the servomotor 22 makes an adjustment to the optical recording head 10 until there is no longer any difference in voltage present between the inputs 33 and 34 of the difference amplifier 32. The voltage of the difference amplifier 32 as emitted will then amount to the output value of zero. The pulse stage 35 at this transition through zero produces a rectangular pulse which is fed to the AND gate 36.

During the course of the events described above, the stepping rotor 37, which shifts the flash-mechanism 12 along the spindle 32, will have been switched foward. This was also effected by the pulse which proceeded from the pre-selective digital counter 8, closed the electronic gate 7 and moved the stepping switch 16, this pulse being fed to the OPEN input 39 of the electronic gate 40. Consequently, from the frequency generator 41 a number of pulses can be fed by way of the electronic gate 40 to the counter 42, the latter passing these in amplified form to the stepping motor 37. After a preselected number of pulses, the counter 42 emits a pulse to the CLOSE input 43 of the electronic gate 40 and resets itself to zero. The electronic gate 40 does not allow further pulses to reach the stepping motor 37. The pulse which closes the electronic gate 40 is, however, simultaneously also fed to the AND gate 36, which now emits a pulse to the OPEN input 44 of the electronic gate 7. This electronic gate 7 therefore opens and once more allows rectangular pulses coming from the pulse generator 6 to pass through to the pre-selective digital counter 8. The procedure described consequently repeats itself.

As regards the AND gate 36, it should be noted that this AND gate may be equipped with a memory, for example in the form of two flip-flop units which are interposed in front of the two AND inputs 45 and 46. These flip-flops are switched back by the pulse leaving the AND gate 36.

By the switching system indicated, the following essential features of the light-processing unit are realized. Any sample of pattern presented may be subdivided into a discrete and constantly repetitive number of subsidiary lengths. Errors in the adjustment of the subsidiary lengths do not operate additively. The same holds true of the light-processing of the pattern on the matrix 1. In addition, through the employment of a precision spindle 38, precisely repeating lengths of pattern can always be applied by optical means. Any error in the overall length of the pattern is the error present in the accuracy of manufacture of the precision spindle 38, and this is limited to a few tenths of a millimetre over a length of approximately 3 m. The number of pulses over a full revolution of the matrix is likewise a discrete number, and a double light-processing of dots also therefore cannot take place in view of the precise adjustability provided by means of the pre-selective digital counter 8, and even if this were the case, no disadvantage would emerge therefrom, as the pattern-presenting roller 4 and the nickel matrix 1 are adjusted to a fixed gear ratio, for instance 1:5 or 1:4, the said twice-exposed points then coinciding.

The abutting joins between the start and the end of the rows of dots situated in the peripheral direction are distributed statistically in the circuitry here set out. The light-processing of the peripheral points is not effected spirally but always in the circumferential direction. Hence, in the flash-mechanism 12 any number of flash units can be accommodated; this means that at the same moment in time as many dots as desired can be light-processed. Care has merely to be taken that in that case an equivalent number of photo-cells are arranged in the optical recording head 10. It is practical to have in the flash-mechanism 12 approximately 10 flash units arranged, these consisting of reflective glavanometers. Such an apparatus is shown in FIG. 2.

Figure 2:
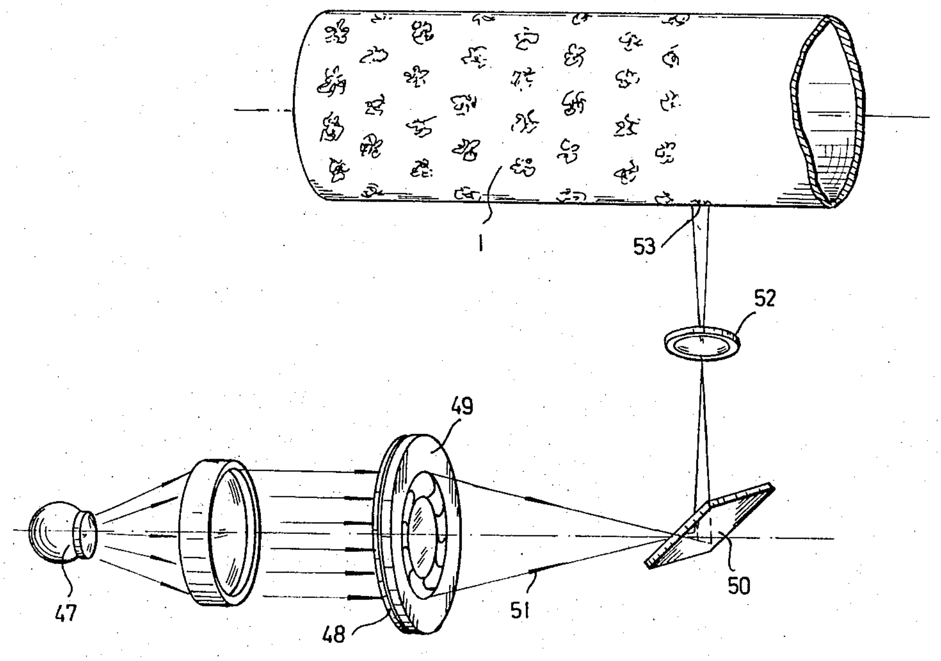
FIG. 2 illustrates the passage of the rays in the flash unit.

In FIG. 2 a light source 47, for instance a mercury vapour lamp, illuminates a matt disc 48 from which the desired shape of dot, for example a hexagonal one, is omitted by way of a shutter 49. A reflective loop galvanemeter 50 facilitates the path 51 of the rays by way of the optical head 52, so that a diminished image 53 of the section of matt disc released by the shutter 49 is projected on to the matrix 1. The reflective loop galvanemeter 50 is rotated into the position shown in FIG. 2 in the event that actuation occurs through the AND gate shown in FIG. 1. Since this reflective loop galvanemeter 50 has a frequency of approximately 10,000 to 12,000 Hz, a rectangular pulse of approximately 1,000Hz can be achieved by the reflective loop galvanemeter 50 with adequate accuracy. This means that the reflective loop galvanemeter 50 for a period amounting to a millisecond is placed in the position shown in thick black lines, and within one ten-thousandth of a second this positioning procedure gets completed or the resetting procedure is likewise once more carried out. With a concurrent arrangement of approximately ten such galvanometers, 10,000 points can be light-processed every second. The speed of the positioning procedures results in the circumstance that the tilting procedure of the reflective loop galvanemeter 50 no longer emerges as a disturbing factor. Further, in the path 51 of the rays a polygonal mirror can be arranged so that the image 53 can be synchronously transported by the matrix surface as that shifts forward.

This polygonal mirror is not shown in the accompanying Figures.

In FIG. 5 the optical recording head 10 is once more illustrated. The pattern-presenting roller 4 is driven with the aid of three toothed wheels 54, 55, 56 so that it can be displaced along the straight line 57 without the driving procedure being interrupted. Thus it is possible to adjust the forward tangential plane 58 to the pattern-presenting roller 4 to be always at a definite distance 59 from the scanning optic 60 on the turret-type lens system 11. The adjustment is facilitated by an adjusting lens system (rigidly attached to the optical recording head 10) through the agency of a ray-diverting mirror 62. The turret-type lens system 11 is, for instance, fitted with seven lenses which make it possible to project the image of the presented pattern in such a way onto the photo-cells arranged inside the optical recording head 10 that these cells are located at the raster-associated dots desired at a given instant. A change-over of the lens entails a transfer to another raster measurement. The same possibility in principle exists in the case of the flash mechanism 12 in which, likewise by an interposed turret-type lens system, the various rasters can be adjusted for by an appropriate magnification or dimimution of the dot-type image to be projected onto the matrix 1. Basically, however, in that regard the shutter 49 could also be changed.

Figure 3:
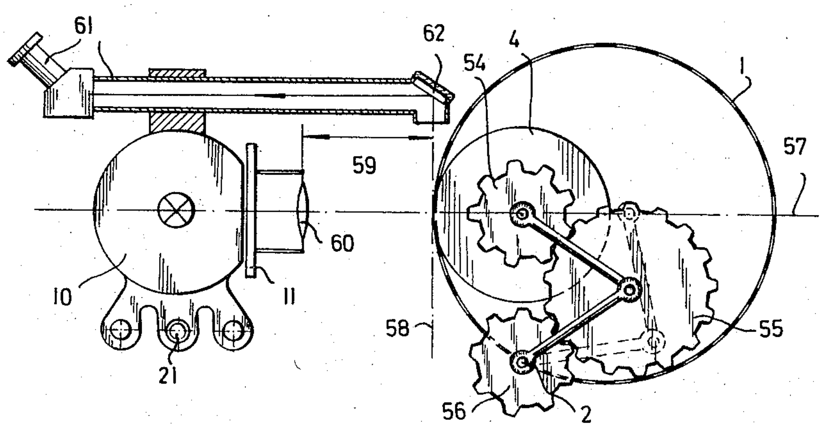
FIG. 3 illustrates the optical recording head and the pattern-presenting roller, together with a regulating device for fine adjustment optically.

The invention is not limited to the embodiments so far described and illustrated. For example, instead of the turret-type less system shown in FIGS. 1 and 3, an optic with an adjustable focus (anelastic lens) could be used, by altering the focus by adjusting the marks inserted around the edge of the objective, the size of raster in the scanning unit being altered. It would also be possible to operate with a rigid lens, and to alter the photo-cells continuously as regards their spacing by means of a mechanical transmission system, or to effect discrete alterations in the spacing of the photo-cells by arranging these at definite intervals on insertable mountings and by exchanging the insertable cards when transferring from one size of raster to another.

Likewise, it is possible, for example, to arrange the shutter behind the mirror 50 when applying the rector-associated point belonging to the arrangement shown in FIG. 2. Further, the emission of parallel light by means of a condenser would be a possible modification which would in addition have the advantage that it would then be possible to increase the strength of the light substantially in comparison with the matt-disc arrangement shown in FIG. 2. Also, the light of this condenser would then proceed as shown by way of the mirror 50, the lens-equipped head 52 being in that case not absolutely necessary. In that situation a simple shadow projection technique is used.

A further modification is provided by the employment of induction-type data sources instead of the marked discs in the pulse generator 6.

Instead of the stepping motor 37, an ordinary servomotor can also be employed, it being possible to effect the exact positioning of the flash mechanism as well as that of the optical recording head with the aid of the voltage difference between a potentiomotor and a precision-type voltage divider. In this instance, it is practical to employ a potentiomotor on each unit, and a single voltage divider.

Furthermore, it is possible to connect the two spindles 21 and 38 with the interposition of a toothed-wheel train and a shift-gear coupling, for example an electromagnetic coupling, the stepping motor 37 then being redundant. Here the shift-gear coupling maintains the position of the flash mechanism unaltered upon the return into its initial position of the optical recording head 10 after it has reached the end 27 of the pattern.

A particular advantage of the circuitry described consists in the fact that variations in voltage, such as eight, for instance, have their origin in the mains supply, have no influence on the precision of the positioning function, thus no expensive investment in respect of voltage stabilization is necessary.

We claim:

1. A method of the production of printing matrices with the aid of at least one light-sensitive layer applied to a matrix or a matrix support, wherein the exposure of the uppermost, light-sensitive layer is effected by the consecutive projection of at least one group of pattern-dictated raster dots in the peripheral direction of the matrix or the matrix support, producing a length of said pattern, said lengths being determined in relation to a cylinder-generating length, and subdivided into a given number of equal fractional areas that is dependent on the raster-number selected and on the total of photo-cells present in the optical recording head, as well as on the focal length of the latter, the fractional areas being arranged to be sensed in succession in the peripheral direction with the optical recording head immobile and rotating a pattern carrying roller.

2. An apparatus for the production of printing matrices, comprising a matrix or matrix support adapted to receive at least one light-sensitive layer, a raster dot pattern-carrying roller adapted to receive a single pattern and means for exposing the uppermost light-sensitive layer by the consecutive projection of the raster dots or groups of the raster dots in the peripheral direction of the matrix or matrix support.

3. The apparatus, as set forth in claim 2, wherein there is provided, between the pattern-carrying roller and the matrix or matrix support, a gear train having a whole number gear ratio.

4. The apparatus, as set forth in claim 2, wherein the pattern-carrying roller is adapted to be scanned optically in the peripheral direction by at least one photo-cell, the light and dark sequence recorded by each photo-cell being arranged to be superimposed on individual pulses initiated by a pulse generator and light-processed onto the matrix or matrix support.

5. The apparatus, as set forth in claim 4, wherein the number of pulses omitted by the pulse generator is arranged to be proportional to the angle of rotation of the matrix or matrix support and is discretely divisible into the circumference of the matrix or matrix support.

6. The apparatus, as set forth in claim 5, wherein the pulses in the pulse generator are arranged to be initiated by optical grade marked-cut discs by means of photo-cells.

7. The apparatus, as set forth in claim 5, wherein the pulses in the pulse generator are arranged to be initiated by an induction technique.

8. The apparatus, as set forth in claim 4, wherein an optical recording head with a fixed focal length is provided.

9. The apparatus, as set forth in claim 4, wherein an optical recording head with an adjustable focal length (an elastic lens) is provided.

10. The apparatus, as set forth in claim 4, wherein, an optical recording head with a turret-type lens system is provided.

11. The apparatus, as set forth in claim 8, wherein a number of photo-cells is installed in the optical recording head, the arrangement of said photo-cells corresponding to the raster selected.

12. The apparatus, as set forth in claim 11, wherein the photo-cells are exchanged in groups, for instance in the form of insertable components, corresponding to the raster-type and raster-number of the raster to be light-processed.

13. The apparatus, as set forth in claim 2, wherein the optical recording head is positioned by being connected to an arrangement for step-by-step displacement which is coupled electrically or mechanically to a light-processing arrangement which responds upon the halting of the optical recording head between the individual steps.

14. The apparatus, as set forth in claim 13, wherein the recording head is mounted on a precision spindle driven by a servomotor, an arrangement in each instance actuating the servomotor until the recording head has been displaced by a specifically predetermined step.

15. The apparatus, as set forth in claim 2, which is arranged such that during the light-processing of the fractional area of pattern applied on the pattern-carrying roller, in every instance following a revolution of the matrix or matrix support, a flash unit is displaced simultaneously with and in the same direction as the optical recording head, the paths of displacement of these two units being proportional to each other.

16. The apparatus, as set forth in claim 15, arranged such that after the termination of the light-processing of a fractional area of pattern applied to the pattern-carrying unit the optical recording head returns to its initial position while the flash unit travels along its normal path of displacement.

17. The apparatus, as set forth in claim 15, wherein a precision spindle adapted to be driven by means of a servometer is provided for the positioning of the flash unit.

18. The apparatus, as set forth in claim 17, wherein the precision spindle is adapted to be driven by the servomotor for the displacement device for the optical recording head by way of a shiftable coupling and a gear train with an alterable gear ratio.

19. The apparatus, as set forth in claim 17, wherein the servomotor is a stepping motor.

20. The apparatus, as set forth in claim 19, wherein the servomotor is in each instance adapted to be set in operation for as long as a voltage drop is present between a precision potentiometer (whose resistance is dependent on the position of the optical recording head) and a given step of a voltage divider.

21. The apparatus, as set forth in claim 20, wherein the same voltage divider is employed for the positioning of the optical recording head and of the flash unit.

22. The apparatus, as set forth in claim 21, wherein at least one reflective loop galvanometer is installed in the path of the rays of the flash unit.

23. The apparatus, as set forth in claim 22, wherein the frequency of oscillation of the reflective loop galvanometer is in the range from 10,000 to 14,000 Hz.

24. The apparatus, as set forth in claim 4, wherein the pulse generator is mechanically coupled to the matrix or matrix support.

25. The apparatus, as set forth in claim 4, wherein said pulse generator is coupled mechanically rigidly with said matrix.

* * * * *